United States Patent
Suzuki et al.

(10) Patent No.: US 7,484,760 B2
(45) Date of Patent: Feb. 3, 2009

(54) COLUMN HOLE COVER

(75) Inventors: Hirohisa Suzuki, Kashihara (JP); Seizou Furukawa, Osaka (JP); Noboru Yamamoto, Kurashiki (JP); Teruya Fujiwara, Kurashiki (JP)

(73) Assignees: Koyo Seiko Co., Ltd., Osaka (JP); Marugo Rubber Industries, Ltd., Okayama (JP)

( * ) Notice: Subject to any disclaimer, the term of this patent is extended or adjusted under 35 U.S.C. 154(b) by 429 days.

(21) Appl. No.: 10/828,503

(22) Filed: Apr. 21, 2004

(65) Prior Publication Data

US 2004/0256849 A1 Dec. 23, 2004

(30) Foreign Application Priority Data

Apr. 23, 2003 (JP) ............... 2003-118916

(51) Int. Cl.
 *B62D 1/16* (2006.01)
(52) U.S. Cl. ............... 280/779; 277/392; 277/634; 277/635; 277/644; 280/780
(58) Field of Classification Search ............... 280/779, 280/780; 277/634, 635, 644, 648, 392, 361
 See application file for complete search history.

(56) References Cited

U.S. PATENT DOCUMENTS

| 2,906,552 | A | * | 9/1959 | White | 277/652 |
| 4,840,386 | A | * | 6/1989 | Peitsmeier et al. | 277/636 |
| 4,895,391 | A | * | 1/1990 | Groat | 280/779 |
| 5,312,200 | A | * | 5/1994 | Buhl et al. | 403/134 |
| 5,492,338 | A | * | 2/1996 | Grafenstein | 277/630 |
| 5,816,615 | A | * | 10/1998 | Dupont et al. | 280/780 |
| 5,904,357 | A | * | 5/1999 | Demirdogen et al. | 277/630 |
| 5,975,609 | A | * | 11/1999 | Campbell | 296/39.3 |
| 6,056,294 | A | * | 5/2000 | Smith | 277/587 |
| 6,056,297 | A | * | 5/2000 | Harkrader et al. | 277/634 |
| 6,308,959 | B1 | * | 10/2001 | Sokolihs et al. | 277/394 |
| 6,328,315 | B1 | * | 12/2001 | Hebenstreit | 277/634 |
| 6,367,810 | B1 | * | 4/2002 | Hatch | 277/551 |
| 6,966,559 | B1 | * | 11/2005 | Fischer et al. | 277/635 |
| 7,097,004 | B2 | * | 8/2006 | Barrett et al. | 188/72.4 |
| 7,192,214 | B2 | * | 3/2007 | Schonhoff et al. | 403/134 |

(Continued)

FOREIGN PATENT DOCUMENTS

FR 2684423 * 6/1993 ............... 277/392

(Continued)

*Primary Examiner*—Eric Culbreth
(74) *Attorney, Agent, or Firm*—Rabin & Berdo, P.C.

(57) ABSTRACT

A column hole cover is interposed between a circumferential portion of an aperture of a column hole of an instrument panel and a steering gear box capable of being displaced in a predetermined direction. The column hole cover includes a cylindrical main body extended in the predetermined direction. The main body includes a first annular end portion directly or indirectly fixed to the steering gear box, and a second annular end portion. The second end portion is provided with an annular seal. An intermediate portion between the first and second end portions is provided with a expandable/contractible portion capable of being elastically expanded or contracted in the predetermined direction. Irrespective of the displacement of the steering gear box, the annular seal is maintained in an elastic pressure contact against the circumferential portion of the aperture of the instrument panel by a reaction force of the compressed expandable/contractible portion.

18 Claims, 8 Drawing Sheets

U.S. PATENT DOCUMENTS

| | | | |
|---|---|---|---|
| 7,237,978 B2 * | 7/2007 | Fischer et al. | 403/50 |
| 2002/0067006 A1 * | 6/2002 | Etcheverry | 277/644 |
| 2005/0218642 A1 * | 10/2005 | Yamaguchi et al. | 280/779 |
| 2006/0108782 A1 * | 5/2006 | Kanazawa et al. | 280/779 |

FOREIGN PATENT DOCUMENTS

| | | |
|---|---|---|
| JP | 10-95352 | 4/1998 |
| JP | 11-078912 | 3/1999 |
| JP | 2000-95119 | 4/2000 |
| JP | 2002-364758 | 12/2002 |
| JP | 2004-216994 | 8/2004 |

* cited by examiner

COLUMN HOLE COVER

BACKGROUND OF THE INVENTION

1. Field of the Invention

The present invention relates to a column hole cover which is used in automotive vehicles for covering a lower part of a column hole formed at an instrument panel for insertion of a steering column therethrough.

2. Description of Related Art

This type of column hole cover has a tubular shape. The column hole cover has one end thereof fixed to a steering gear box and the other end thereof fixed to a circumferential portion of an aperture of the column hole of the instrument panel via a fixing member such as a band, bolt or clip (see, for example, Japanese Unexamined Patent Publication No.11-78912(1999)). The other end of the column hole cover encloses the aperture of the column hole, thereby preventing muddy water from entering a cabin through the column hole.

However, an operation for fixing the one end of the column hole cover to the instrument panel using the bolt or the like is cumbersome and labor intensive.

It is therefore an object of the present invention to provide a column hole cover which reduces labor involved in the assembly work and can ensure an adequate sealing performance.

SUMMARY OF THE INVENTION

According to a preferred embodiment of the present invention, a column hole cover is interposed between a circumferential portion of an aperture of a column hole formed at an instrument panel for insertion of a steering column therethrough and a steering gear box capable of being displaced in a predetermined direction, and comprises a cylindrical main body extending in the predetermined direction. The main body includes a first annular end portion directly or indirectly fixed to the steering gear box, a second annular end portion, and an intermediate portion between the first and second end portions. The second end portion includes an annular seal. The intermediate portion includes a expandable/contractible portion capable of being elastically expanded/contracted in the predetermined direction. Irrespective of the displacement of the steering gear box, the annular seal is maintained in an elastic pressure contact against the circumferential portion of the aperture of the instrument panel by a reaction force of the compressed expandable/contractible portion.

According to the embodiment of the invention, the seal may be maintained in the pressure contact against the circumferential portion of the aperture of the instrument panel even if the steering gear box is displaced. Therefore, the seal can ensure an adequate sealing performance. Accordingly, the fixing of the column hole cover to the instrument panel by using a screw or the like is not required and hence, the labor involved in assembling the column hole cover can be reduced.

BRIEF DESCRIPTION OF THE DRAWINGS

FIG. 7A is a sectional view showing the seal of the column hole cover in a natural state, whereas

DETAILED DESCRIPTION OF THE PREFERED EMBODIMENTS

Figure 1:
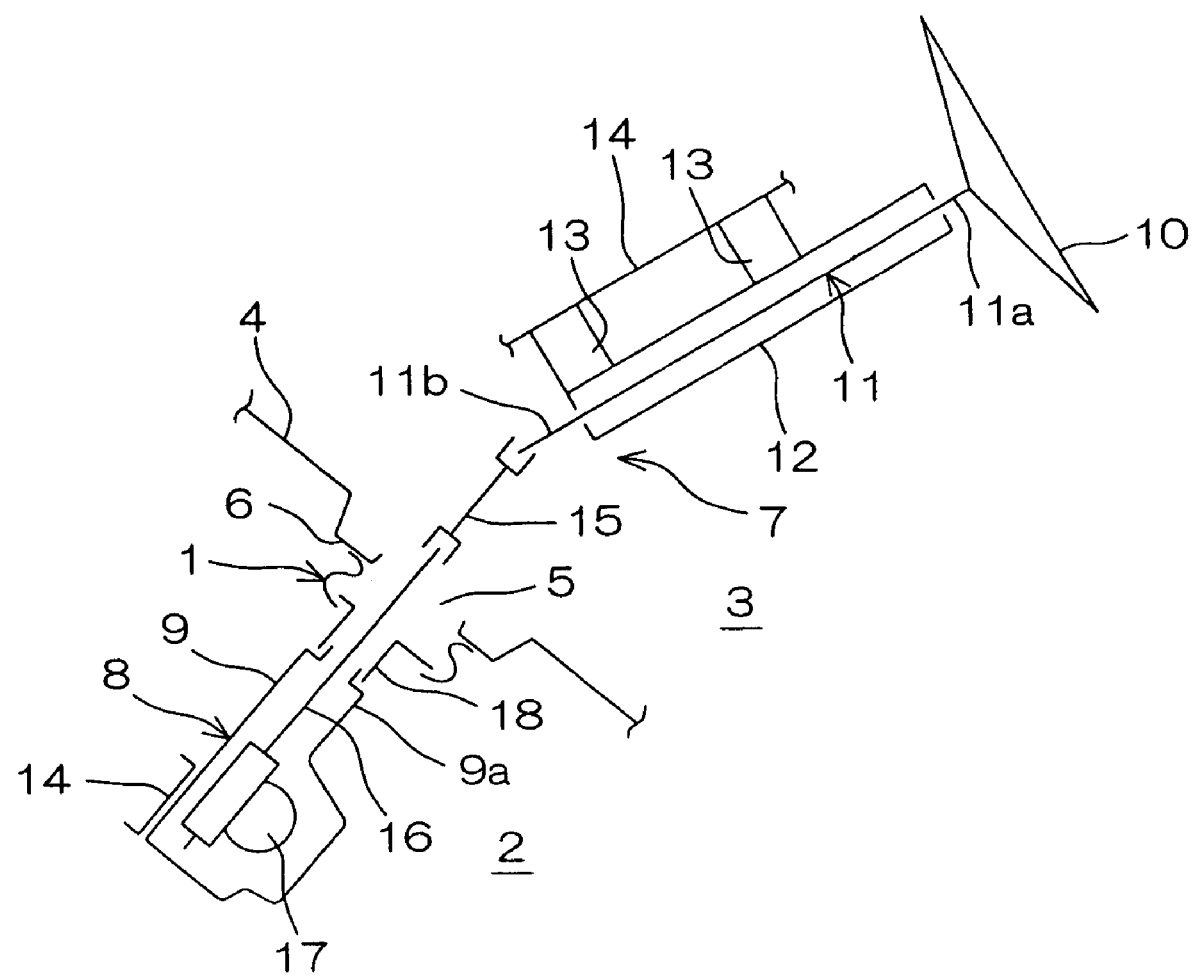
FIG. 1 is a schematic diagram showing a steering apparatus with a column hole cover assembled therein according to one embodiment of the present invention.

A column hole cover according to one embodiment of the present invention will hereinbelow be described with reference to the accompanying drawings. FIG. 1 is a schematic diagram showing a steering apparatus including the column hole cover according to one embodiment of the present invention.

The column hole cover 1 is interposed between a circumferential portion 6 of an aperture 5a (shown in FIG. 2) of a column hole 5 and a steering gear box 9 of a steering mechanism 8 of a steering apparatus 7, the column hole 5 formed at a wall 4a (shown in FIG. 2) of an instrument panel 4 partitioning an engine room 2 and a cabin 3 of an automotive vehicle.

The steering apparatus 7 includes a steering shaft 11, to one end 11a of which a steering wheel 10 is mounted. The steering shaft 11 is rotatably supported by a vehicle body 14 via a steering column 12 and a bracket 13. The other end 11b of the steering shaft 11 is coupled to a pinion shaft 16 of the steering mechanism 8 via an intermediate shaft 15 and the like, the steering mechanism 8 constituted by, for example, a rack and pinion mechanism for steering road wheels (not shown). The pinion shaft 16 is rotatably supported by the steering gear box 9 and is meshed with a rack bar 17. The rack bar 17 is connected with the road wheels at ends thereof.

The steering wheel 10, the steering shaft 11 and the like are disposed in the cabin 3. The steering mechanism 8 is disposed in the engine room 2, whereas the steering gear box 9 is supported by the vehicle body 14. The pinion shaft 16 is extended out of one end 9a of the steering gear box 9, through the column hole 5 at the instrument panel 4 and into the cabin 3, where the pinion shaft 16 is coupled to the intermediate shaft 15.

Figure 2:
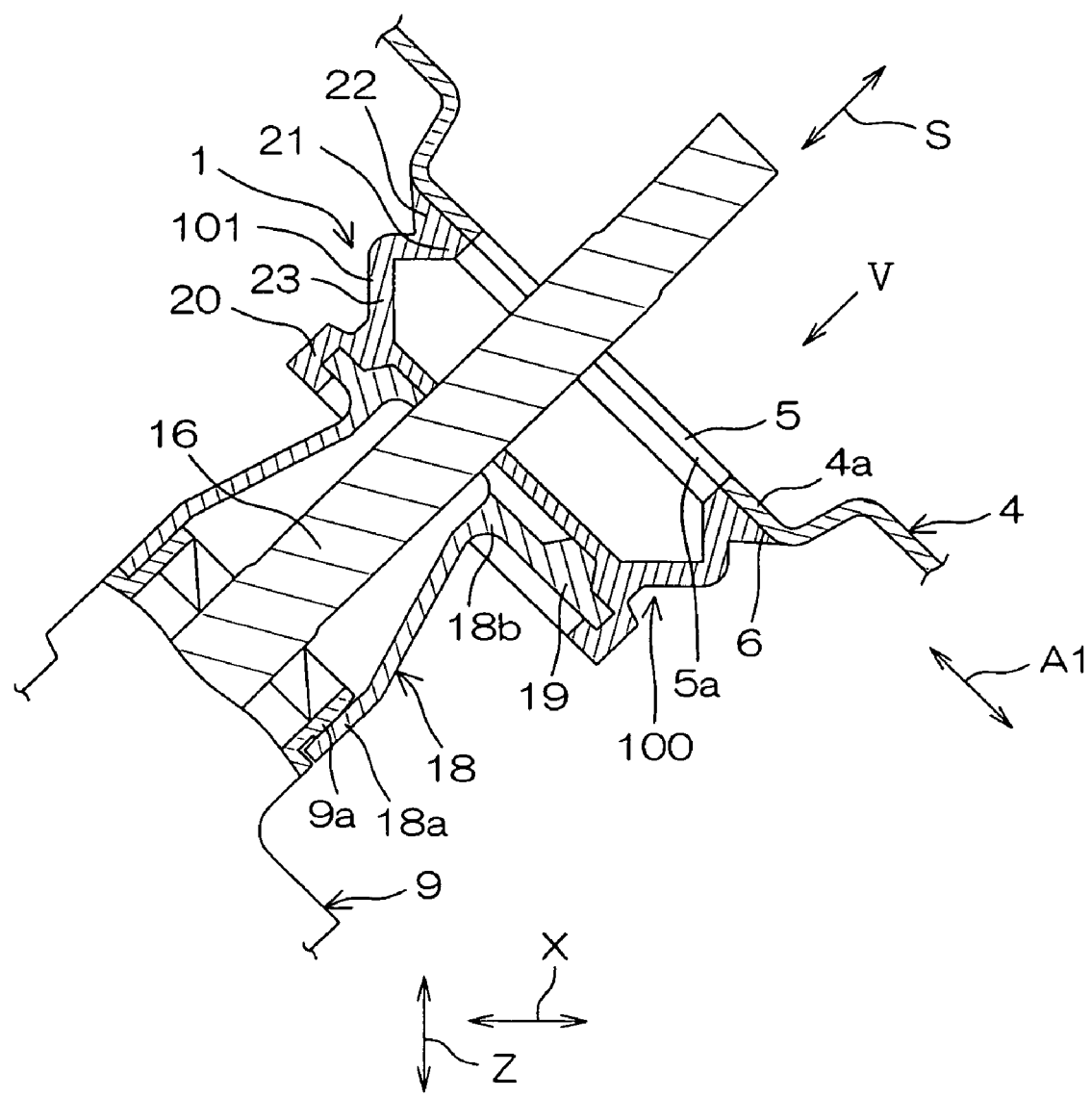
FIG. 2 is a sectional view showing a principal part of the steering apparatus with the column hole cover.

FIG. 2 is referred to. The wall 4a of the instrument panel 4 formed with the column hole 5 is disposed as inclined relative to a vertical direction Z and an anteroposterior direction X of the vehicle. Specifically, the wall 4a is oriented forwardly in a manner to be inclined downwardly.

Figure 3A:
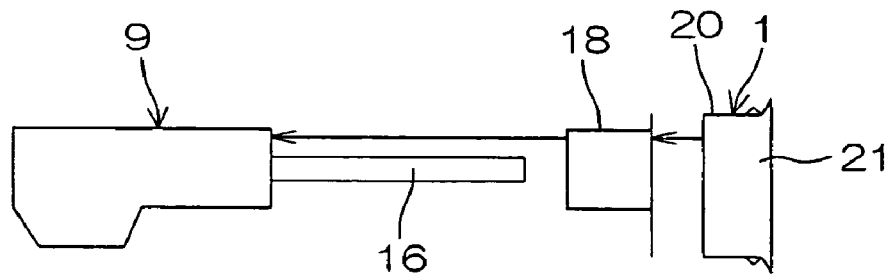
FIGS. 3A, 3B and 3C are schematic diagrams illustrating a sequence of steps for assembling the column hole cover.
Figure 3B:
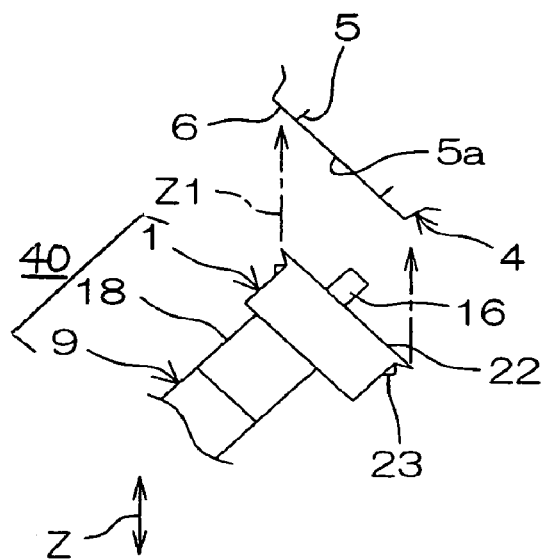

As will be described hereinlater, during the assembly work of the steering apparatus 7, the pinion shaft 16 inclined relative to the vertical direction Z, as shown in FIG. 3B, is inserted through the column hole as moved along the vertical direction Z. In order to permit the insertion of the pinion shaft 16, the aperture 5a of the column hole 5 is formed in the inclined wall 4a of the instrument panel 4 in a manner to be elongated vertically (in a direction indicated by Arrow A1 in FIG. 2).

Fixed to the one end 9a of the steering gear box 9 is one end 18a of a cylindrical spacer 18 as a hard member formed from a resin material. The spacer 18 is formed with an annular flange 19 at other end 18b thereof, the flange 19 extended radially outwardly of the spacer 18. The cylindrical column hole cover 1 is fitted on an outside circumference of the flange 19 so as to be fixed thereto. The column hole cover 1 and the spacer 18 allow the pinion shaft 16 as a part of the steering apparatus 7 to extend therethrough thereby covering the same.

The column hole cover 1 includes a cylindrical main body 100. The cylindrical main body 100 is formed as a single-walled cylinder having a center axis. As such, the column hole cover has no other cylinders in an area inside of the cylindrical main body. The main body 100 includes a first annular end portion 20 indirectly fixed to the steering gear box 9 via the spacer 18; a second annular end portion 21 retained along the wall 4a of the instrument panel 4; and an intermediate portion 101 between the first and second end portions 20, 21. The second end portion 21 is provided with an annular seal 22. The intermediate portion 101 is provided with a bellows 23 as an expandable/contractible portion which can be elastically expanded or contracted along an axial direction S of the column hole cover 1.

The column hole cover 1 is formed of a rubber member such as of an ethylene-propylene-diene rubber (EPDM) or a chloroprene rubber (CR). Because of the use of the rubber member as the column hole cover 1, the bellows 23 can achieve a high durability while the annular seal 22 can achieve a high sealing performance.

The mounting of the column hole cover 1 may be accomplished by assembling the first end portion 20 together with the spacer 18, and the steering gear box 9. The spacer 18 is disposed between the first end portion 20 and the steering gear box 9. The second end portion 21 is retained as simply pressed against the instrument panel 4, thus negating the need to be fixed by using a screw or another fixing means.

A specific description is made with reference to FIG. 3A. First, the first end portion 20 of the column hole cover 1 is fixed to the steering gear box 9 via the spacer 18. Thus is formed a sub-assembly 40 of the steering apparatus, which includes the column hole cover 1, the spacer 18 and the steering gear box 9.

Next, referring to Fig.3B, the axial direction S of the column hole cover 1 is inclined relative to the vertical direction Z so as to bring the annular seal 22 substantially into parallel relation with the circumferential portion 6 of the aperture 5a of the column hole 5. The sub-assembly 40 including the column hole cover 1 held in this position is bodily moved from place just below the column hole 5 of the instrument panel 4 along an upward direction Z1 until the annular seal 22 of the column hole cover 1 is abutted on the inclined circumferential portion 6 of the aperture 5a of the column hole 5. At this time, the column hole cover 1 is moved toward the inclined circumferential portion 6 along a direction obliquely intersecting the inclined circumferential portion 6 (equivalent to the upward direction Z1).

Figure 3C:
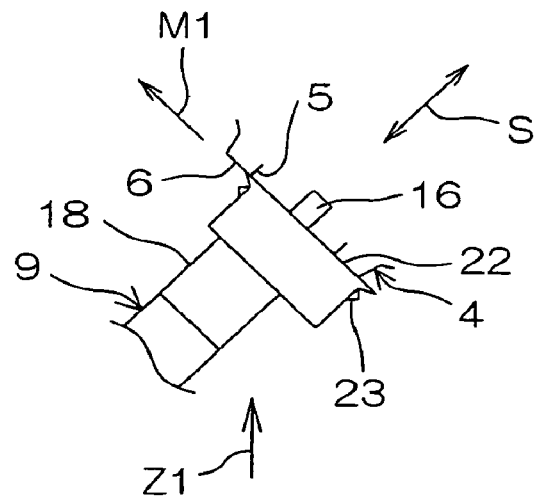

As shown in FIG. 3C, the movement of the column hole cover 1 in the upward direction Z1 brings the annular seal 22 into abutting state on the circumferential portion 6 of the aperture 5a. After the annular seal 22 is abutted on the circumferential portion 6, the sub-assembly 40 is continued to be displaced in the upward direction Z1, whereby the annular seal 22 is slid on the circumferential portion 6 along an obliquely upward direction M1 while the bellows 23 is elastically compressed. Thus, as shown in FIG. 2, a hole of the column hole cover 1 is substantially aligned with the aperture 5a of the column hole 5. Subsequently, the steering gear box 9 of the sub-assembly 40 is fixed to the vehicle body 14 at a predetermined position whereby the column hole cover 1 is retained in the assembled position shown in FIG. 2.

In the assembled state shown in FIG. 2, the bellows 23 is in compression, thus producing an elastic repulsive force acting to press the annular seal 22 against the circumferential portion 6 of the aperture 5a. The bellows 23 functions as the expandable/contractible portion for confining the second end portion 21 of the column hole cover 1 to the instrument panel 4 as elastically pressing the annular seal 22 against the circumferential portion 6 of the aperture 5a of the instrument panel 4.

In the assembled state, the axial direction S of the column hole cover 1 is substantially in parallel with the pinion shaft 16. As viewed in side elevation, the axial direction S of the column hole cover 1 is so located as to intersect with the circumferential portion 6 of the aperture 5a at an angle or for example, substantially at right angles.

The steering gear box 9 is displaced under an external force transmitted from the road wheels. In order to cope with the displacement, the bellows 23 has such an amount of elastic stroke as to accept the displacement of the steering gear box 9 as holding the annular seal 22 in the pressure contact against the circumferential portion 6 of the aperture 5a of the instrument panel 4.

Figure 5:
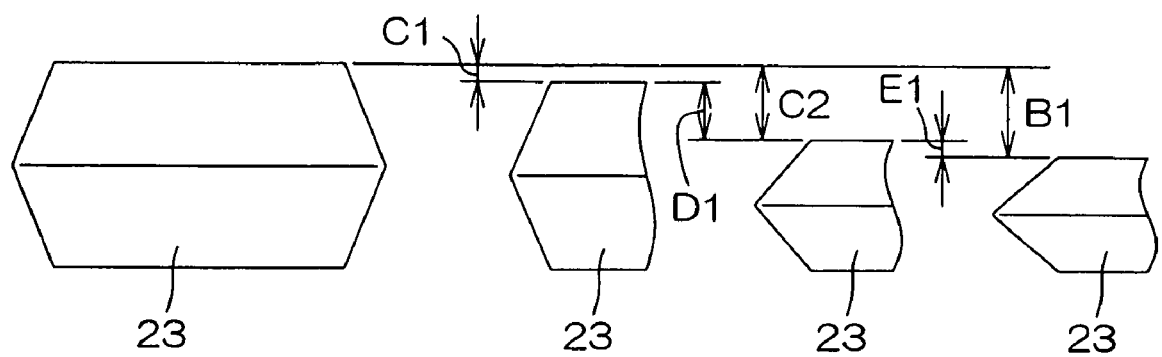
FIG. 5 is a schematic diagram showing the variations of the amount of compression of a bellows.

FIG. 5 schematically shows four bellows 23 arranged in a line. The leftmost bellows 23 represents the natural state free from compression, whereas the rightmost bellows 23 represents a state compressed to the maximum compressible amount B1. The second left bellows 23 represents a state where the bellows is compressed by the minimum compression amount C1 at an initial stage of the assembly work. The third left bellows 23 represents a state where the bellows is compressed by the maximum compression amount C2 in the assembled state. A difference between the maximum compression amount C2 and the minimum compression amount C1 (C2−C1) corresponds to the maximum displacement D1 of the steering gear box 9. That is, D1=C2−C1.

On the other hand, the maximum compressible amount B1 is designed to be greater than the maximum displacement D1 of the steering gear box 9. That is, B1>D1.

Figure 4A:
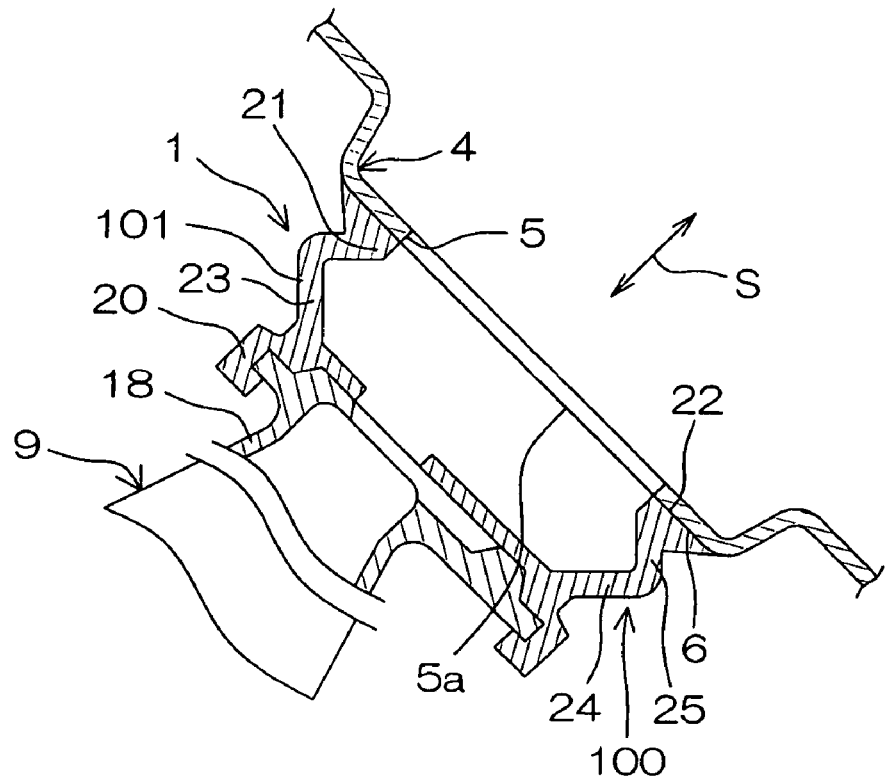
FIGS. 4A and 4B are sectional views of the column hole cover, FIG. 4A showing the column hole cover in an initially assembled state, FIG. 4B showing the column hole cover compressed to the maximum amount of compression in the assembled state.

At the initial stage of the assembly work of the column hole cover 1 as shown in FIG. 4A, the steering gear box 9 is located at the lowermost position. Specifically, referring to FIG. 5, the bellows 23 assumes a first position to be compressed by the minimum compression amount C1 in the assembled state (equivalent to an initial compression amount), so that the annular seal 22 is retained in the pressure contact against the circumferential portion 6.

Figure 4B:
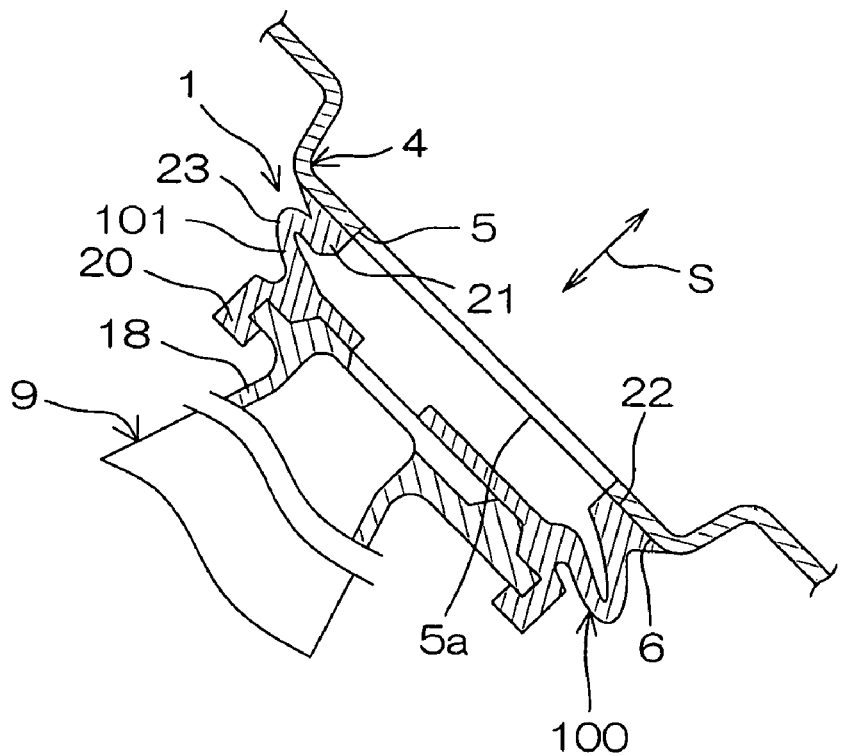

When the steering gear box 9 is displaced to the uppermost position as shown in FIG. 4B, the bellows 23 assumes a second position to be compressed by the maximum compression amount C2 (see FIG. 5) in the assembled state. In other words, the bellows 23 assumes the position to have the shortest length with respect to the axial direction S.

In the second position, the bellows 23 is compressed by the maximum compression amount C2 (=C1+D1) combining the aforesaid initial compression amount C1 and the maximum displacement D1 of the steering gear box 9. The maximum compression amount C2 is smaller than the maximum compressible amount B1 of the bellows 23 itself. That is, B1>C2 (E1=B1−C2, E1>0). Therefore, the bellows 23 is adapted to retain the annular seal 22 in the pressure contact against the circumferential portion 6 of the aperture 5a without sustaining strain.

In this manner, the annular seal 22 may be held in the pressure contact against the circumferential portion 6 of the aperture 5a of the instrument panel 4 in spite of the displacement of the steering gear box 9 and hence, an adequate sealing performance may be ensured. Accordingly, the labor involved in the assembly work is reduced because the fixing of the column hole cover 1 to the instrument panel 4 obviates the use of a screw or the like.

Returning to FIG. 4A, the bellows 23 includes a first and a second annular face portion 24, 25 which are located in the vicinity of the first end portion 20 and the second end portion 21, respectively. The annular face portions 24, 25 are connected with each other at their outside circumferential edges. On the other hand, inside circumferential edges of the annular face portions 24, 25 are separated from each other. The annular face portions 24, 25 form a convex portion, a crest of which is defined by the outside circumferential edges thereof and slopes of which are defined by the annular face portions 24, 25. In a case where the bellows 23 consists of a single convex portion, the bellows is less prone to tilt when compressed. The annular seal 22 is formed adjacent to the second annular face portion 25 in a manner to be in direct connection with an inside circumferential edge of the annular face portion 25.

Figure 6:
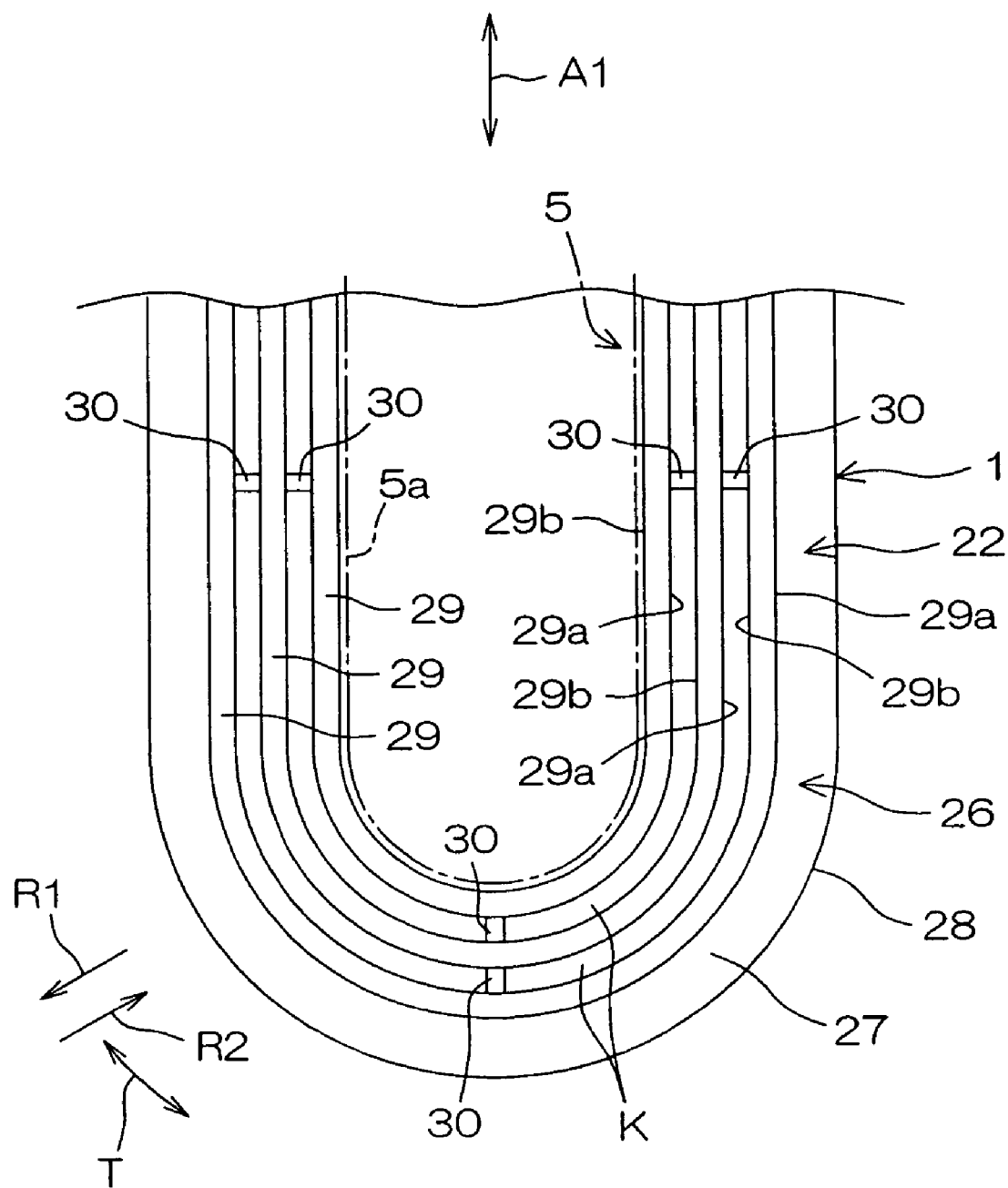
FIG. 6 is a plan view showing an end face of a skirt portion of a seal of the column hole cover.
Figure 7A:
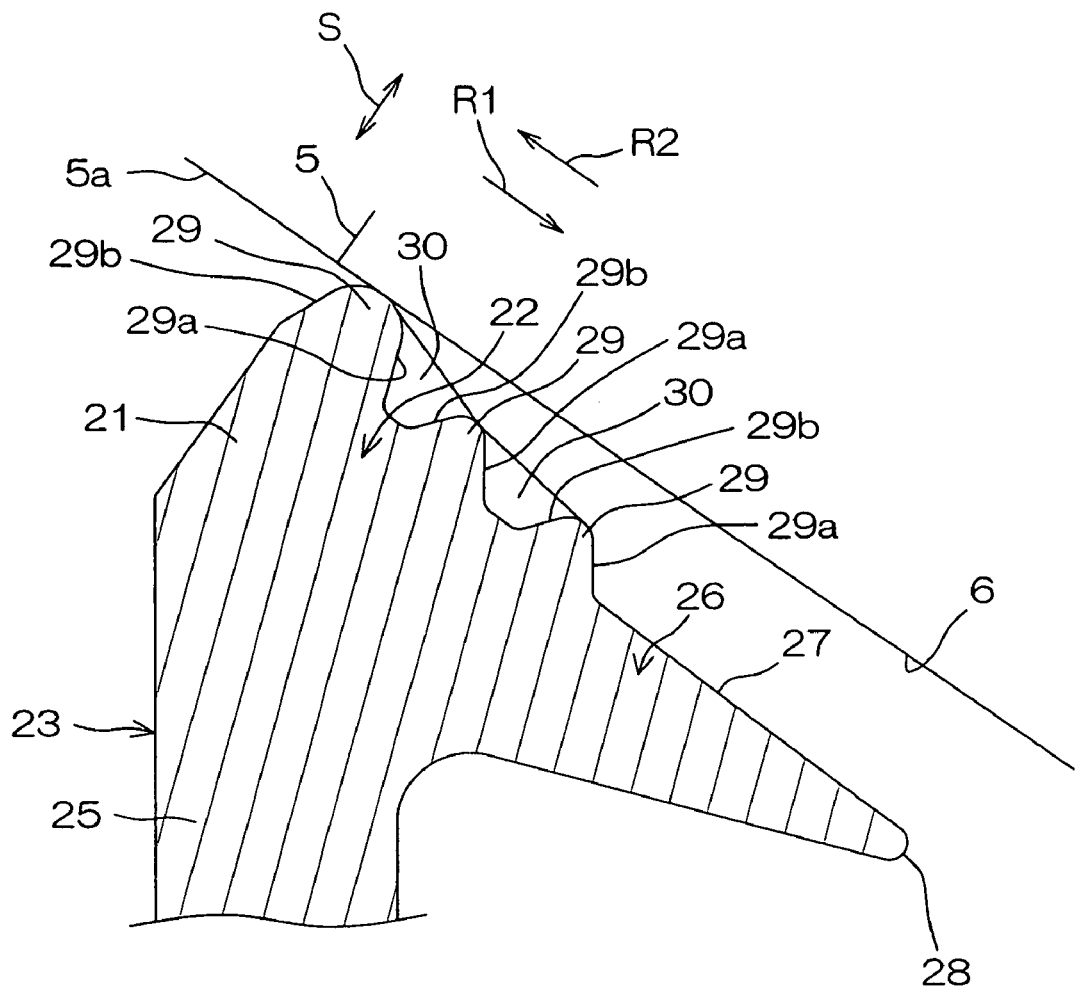

Next, FIGS. 6 and 7A are referred to. The annular seal 22 includes an annular flange 26 extended from the end of the bellows 23 in a radially outward direction R1 of the column hole cover 1 in a manner to surround the aperture 5a. The annular flange 26 has a confronting face 27 in face-to-face relation with the circumferential portion 6 of the aperture 5a. An outside circumference portion 28 of the annular flange 26 is reduced in thickness.

The annular seal 22 includes a plurality of for example, three annular seal lips 29 formed on the confronting face 27 of the annular flange 26 as defining a respective space interval therebetween; and a plurality of for example, eight radial ribs 30 (only some of which are shown in the figure) intersecting with these plural annular seal lips 29. The annular seal lips 29 and radial ribs 30 project in parallel with the axial direction S of the column hole cover 1.

The plural annular seal lips 29 are arranged concentrically such that the inner annular seal lips 29 are successively surrounded by the outer seal lips 29. The innermost seal lip 29 is arranged along an inside circumference of the confronting face 27 of the annular seal 22. The outermost seal lip 29 is located substantially intermediately of the confronting face 27 with respect to the radial direction R1, R2 of the column hole cover 1.

The annular seal lip 29 is elastically deformed by being pressed against the circumferential portion 6 of the aperture 5a, thereby attaining a required sealing length along the radial direction R1, R2 of the column hole cover 1. Thus, the annular seal lip 29 provides a seal between the circumferential portion 6 of the aperture 5a and the annular seal 22.

The radial rib 30 interconnects an outer side 29a of an inner annular seal lip 29 and an inner side 29b of an outer annular seal lip 29 so as to divide a region K therebetween. The radial ribs 30 are arranged along a circumferential direction T of the column hole cover 1 and located at a plurality of say four places at given space intervals. In a state where the column hole cover 1 is assembled, the radial ribs 30 are abutted on the circumferential portion 6 of the aperture 5a. The radial ribs 30 are capable of preventing the tilt of the annular seal lips 29, when the annular seal 22 is slidably moved along the circumferential portion 6 of the aperture 5a.

The outside circumference portion 28 of the annular flange 26 is formed thin, or more preferably is progressively decreased in thickness along the radially outward direction R1. This is effective to enhance the flexibility of the outside circumference portion 28 such that the outside circumference portion 28 may be further increased in adhesion to the circumferential portion 6 of the aperture 5a when subjected to an external water pressure. On the other hand, at least one or more preferably more than one of the plural annular seal lips 29 can assuredly seal between the circumferential portion 6 of the aperture 5a and the annular flange 26.

If the annular seal 22 should be displaced relative to the circumferential portion 6 of the aperture 5a, so as to present a part thereof into the aperture 5a of the instrument panel 4 and also to allow the invasion of external muddy water or the like into the space between the annular seal lips 29, the radial ribs 30 can prevent the muddy water from moving circumferentially along the region K between the annular seal lips 29. Therefore, there is no fear of the muddy water entering the aperture 5a.

Accordingly, the assembly work of the column hole cover 1 negates the need for paying a particular attention to a misalignment of the annular seal 22 relative to the circumferential portion 6 of the aperture 5a. Hence, the labor involved in the assembly work may be reduced even further.

Figure 7B:
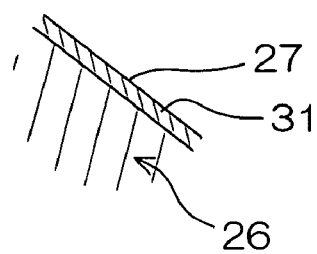
FIG. 7B is an enlarged view of a principal part of FIG. 7A.

At least the confronting face 27 of the annular seal 22 is subjected to a sliding resistance reduction processing for reducing sliding resistance with respect to the circumferential portion 6 of the aperture 5a. The sliding resistance reduction processing may be exemplified by a silicone resin coating. Specifically, referring to FIG. 7B, a coat 31 is overlaid on the confronting face 27, the coat 31 containing a material such as silicon resin having a lower sliding friction/resistance than the rubber member. This provides for an easy alignment of the column hole cover 1, permitting a light force to slidably move the annular seal 22 of the column hole cover 1 along the circumferential portion 6 of the aperture 5a. Thus, the labor involved in the assembly work may be even further reduced.

In the natural state, a tip of an annular seal lip 29 on a radially outer side R1 with respect to the column hole cover 1 is located closer to the bellows 23 or to the first end portion 20 with respect to the axial direction S of the column hole cover 1, as compared with a tip of an annular seal lip 29 on a radially inner side R2. Of the confronting face 27, the outside circumference portion 28 is located closest to the first end portion 20.

This affords the following effect. When, in the assembly work of the column hole cover 1, the annular seal 22 positioned substantially in parallel with the circumferential portion 6 of the aperture Sa is moved toward the circumferential portion, the annular seal lip 29 on the radially inner side R2 is first brought into contact with the circumferential portion 6 of the aperture 5a. Subsequently, the annular seal lip 29 of the annular seal 22, as located on the radially outer side R1, is brought into contact with the circumferential portion as the contact pressure thereagainst is increased. Thereafter, the thin outside circumference portion 28 of the annular seal 22 is brought into tight contact with the circumferential portion 6 of the aperture 5a in a manner to be wrapped thereover.

It is to be noted that the embodiment of the present invention is not limited to the above. The following description focuses on differences from the foregoing embodiment. Description of like parts is dispensed with while such like parts are accompanied by the same reference characters as those of the foregoing embodiment, respectively.

Figure 8A:
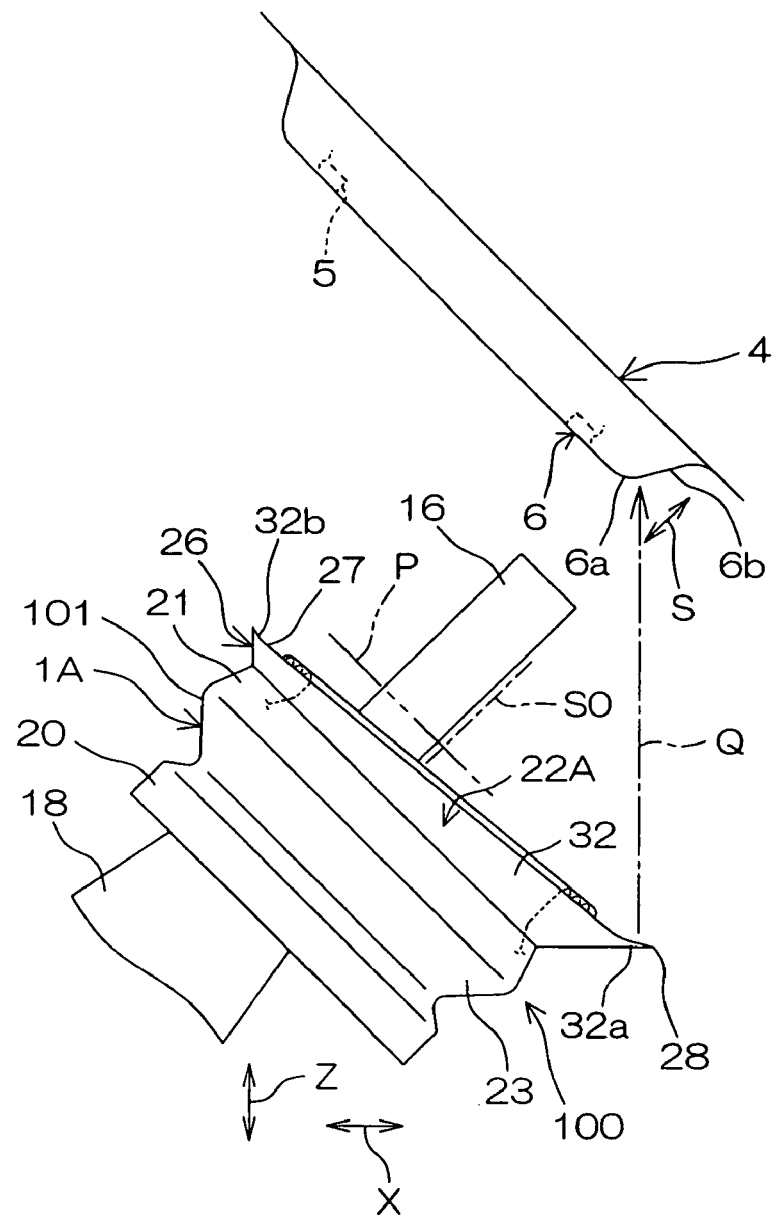
FIG. 8A is a side view showing a column hole cover according to another embodiment of the present invention and an instrument panel, the column hole cover allowed to stand in the natural state.

Referring to FIG. 8A, for example, an annular seal 22A of a column hole cover 1A may be formed with a skirt portion 32 which is formed by inclining the outside circumference portion 28 of the annular seal 22A obliquely relative to a plane P orthogonal to a center axis S0 of the column hole cover 1A.

In the natural state, a biased tip 32a of the skirt portion 32 projects farther along the axial direction S of the column hole cover 1A than an end portion 32b of the skirt portion 32 on the opposite side with respect to the center axis S0.

When assembled to the instrument panel 4, the annular seal 22A is pressed against the circumferential portion 6 of the aperture 5a of the instrument panel 4 (see Arrow P), as positioned in a manner that the tip 32a of the skirt portion 32 is located at a lower position along the inclination than the end portion 32b. In the meantime, the tip 32a of the skirt portion 32 is bent for deformation under pressure.

Figure 8B:
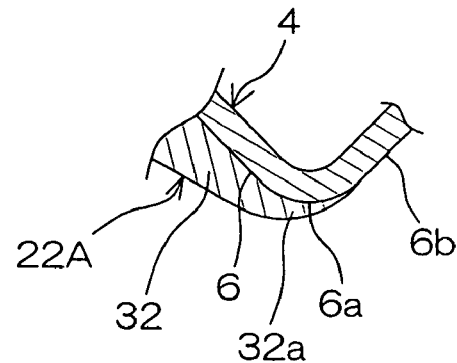
FIG. 8B is an enlarged sectional view showing a biased-side tip of the seal of the column hole cover of FIG. 8A.

Thus, the annular seal 22A may be assembled to the aperture 5a normally formed of a protrusion in a manner that the tip 32a of the skirt portion 32 engages the circumferential portion 6 as extending around from an R-shaped outside edge 6a to a peripheral side 6b of the circumferential portion 6 of the aperture 5a of the instrument panel 4 (see FIG. 8B). Hence, the annular seal 22A may be precisely positioned to the instrument panel 4 during the assembly work.

Other variations may be contemplated which include: omitting at least some of the radial ribs 30; providing one, two or at least four annular seal lips 29; omitting the annular seal lip 29; omitting the thinning of the outside circumference portion 28 of the annular flange 26; positioning the tips of the plural annular seal lips 29 at the same level with respect to the axial direction S or at places progressively farther away from the first end portion 20 along the radially outward direction R1; omitting the sliding resistance reduction processing; moving the annular seal 22, 22A toward the circumferential portion 6 along a direction orthogonal to the circumferential portion 6 of the aperture 5 when the annular seal is assembled; and such.

It may also be contemplated to apply the annular seal 22 including the plural annular seal lips 29 and the plural radial ribs 30 to a column hole cover other than the foregoing embodiments, such as a conventional column hole cover of a type that is fixed to the instrument panel 4 by using a screw or the like. In this case, a particular attention need not be paid to the misalignment during the assembly work and hence, there may be provided an effect to reduce the labor involved in the assembly work.

An alternative arrangement may be made such that the end portion 20 of the column hole cover 1, 1A is directly fixed to the steering gear box 9 so that the cylindrical spacer 18 is dispensed with. In addition, it may also be contemplated to design the column hole cover 1, 1A to cover not only the pinion shaft 16 but also the intermediate shaft 15 as a part of the steering apparatus 7, the end 11b of the steering shaft 11 and the like, for example.

While the invention has been described in details with reference to the specific embodiments thereof, variations and modifications thereof or equivalents thereto will be apparent to those skilled in the art who have fully understood the above description. The scope of the invention, therefore, is construed as defined by the appended claims and equivalents thereto.

The present application corresponds to a Japanese Patent Application No. 2003-118916 filed with Japanese Patent Office on Apr. 23, 2003, and the whole disclosure thereof is incorporated herein by reference.

What is claimed is:

1. A column hole cover interposed between a circumferential portion of an aperture of a column hole formed at an instrument panel for insertion of a steering column therethrough and a steering gear box capable of being displaced in a predetermined direction, the column hole cover comprising:
a cylindrical main body extended in the predetermined direction, and being formed as a single-walled cylinder having a center axis,
the single-walled cylinder of the main body including a first annular end portion directly or indirectly fixed to the steering gear box, a second annular end portion, and an intermediate portion between the first and second end portions,
the second end portion including an annular seal,
the intermediate portion including a expandable/contractible portion capable of being elastically expanded or contracted in the predetermined direction,
wherein, irrespective of the displacement of the steering gear box, the annular seal is maintained in an elastic pressure contact against the circumferential portion of the aperture of the instrument panel by a reaction force of the compressed expandable/contractible portion; and
wherein the column hole cover is free of other cylinders inside of the cylindrical main body.

2. A column hole cover according to claim 1, wherein the annular seal is slidably movable along the circumferential portion of the aperture of the instrument panel in association with the displacement of the steering gear box.

3. A column hole cover according to claim 1, wherein the maximum compressible amount of the expandable/contractible portion is designed to be greater than the maximum displacement of the steering gear box.

4. A column hole cover according to claim 3, wherein the expandable/contractible portion has a predetermined amount of compression when the steering gear box is located farthest away from the circumferential portion of the aperture of the instrument panel.

5. A column hole cover according to claim 1, wherein
the annular seal includes an annular flange,
the annular flange includes a confronting face in face-to-face relation with the circumferential portion of the aperture of the instrument panel, and
the confronting face of the annular flange includes at least one annular seal lip.

6. A column hole cover according to claim 5, wherein
the annular flange includes an outside circumference portion relatively reduced in thickness.

7. A column hole cover according to claim 6, wherein
the at least one annular seal lip includes a plurality of annular seal lips arranged in a concentric relation, and
the confronting face of the annular flange includes a plurality of ribs extended radially to intersect the plural annular seal lips.

8. A column hole cover according to claim .1, wherein the annular seal has a portioncapable of slidably contacting the circumferential portion of the aperture of the instrument panel, and is covered with a coat at the slidably contacting portion thereof, the coat containing a low-friction material.

9. A column hole cover according to claim 8, wherein the coat contains a silicone resin.

10. A column hole cover according to claim 1, wherein the annular seal includes a skirt portion, an outside circumference of which is inclined relative to a plane orthogonal to an axis along the predetermined direction.

11. A column hole cover according to claim 1, wherein the expandable/contractible portion includes a bellows.

12. A column hole cover according to claim 1, wherein a material forming the main body contains a rubber.

13. A column hole cover according to claim 12, wherein the rubber includes an ethylene-propylene-diene rubber.

14. A column hole cover according to claim 12, wherein the rubber includes a chloroprene rubber.

15. A column hole cover according to claim 1, further comprising a cylindrical spacer interposed between the steering gear box and the first end portion of the main body, the spacer being fixed to the steering gear box and the first end portion of the main body.

16. A column hole cover according to claim 1, wherein the first end portion defines a first terminal edge of the single-walled cylinder, and the second end portion defines a second terminal edge of the single-walled cylinder.

17. A column hole cover according to claim 1, wherein the first and second end portions of the main body are end portions with respect to an axial direction of the main body.

18. A column hole cover interposed between a circumferential portion of an aperture of a column hole formed at an instrument panel for insertion of a steering column therethrough and a steering gear box capable of being displaced in a predetermined direction, the column hole cover comprising:

a cylindrical main body extended in the predetermined direction;

the main body including a first annular end portion directly or indirectly fixed to the steering gear box, a second annular end portion, and an intermediate portion between the first and second end portions;

the second annular end portion including an annular seal having an annular flange, the annular flange including an outside circumference portion relatively reduced in thickness, the annular flange further including a confronting face in face-to-face relation with the circumferential portion of the aperture of the instrument panel, the confronting face of the annular flange including a plurality of annular seal lips arranged in a concentric relation, the confronting further including a plurality of ribs extending radially so as to intersect the plural annular seal lips;

the intermediate portion including a expandable/contractible portion capable of being elastically expanded or contracted in the predetermined direction;

wherein, irrespective of the displacement of the steering gear box, the annular seal is maintained in an elastic pressure contact against the circumferential portion of the aperture of the instrument panel by a reaction force of the compressed expandable/contractible portion.

* * * * *